No. 842,790. PATENTED JAN. 29, 1907.
B. T. LANDERS.
HANDLE.
APPLICATION FILED JULY 28, 1906.
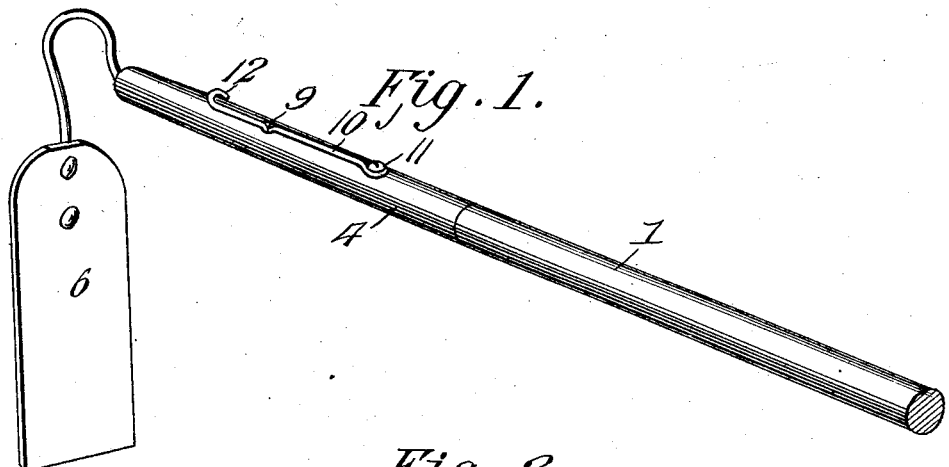
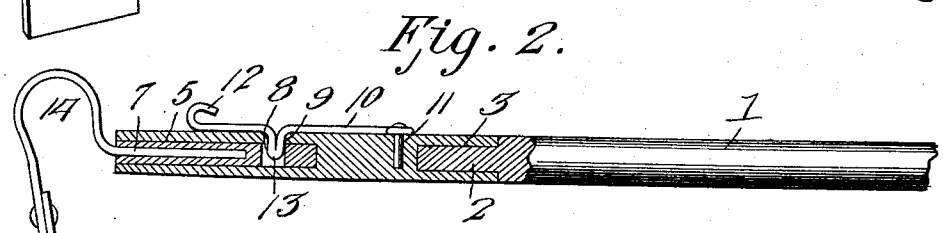
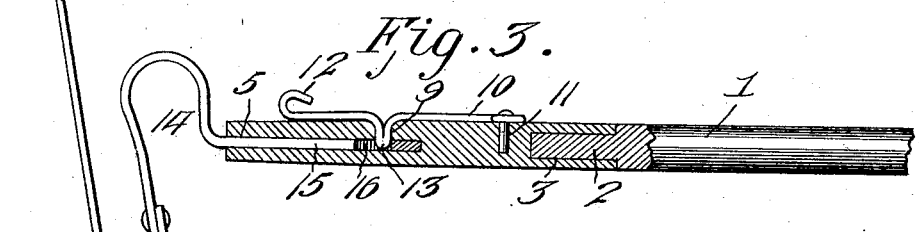
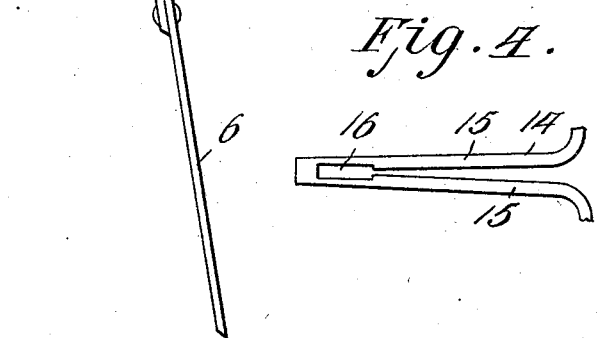
Witnesses
Frank B. Hoffman
D. W. Gould
Inventor
B. T. Landers
By Victor J. Evans
Attorney

UNITED STATES PATENT OFFICE.

BURRELL T. LANDERS, OF CHERRYVALE, KANSAS.

HANDLE.

No. 842,790.  Specification of Letters Patent.  Patented Jan. 29, 1907.

Application filed July 28, 1906. Serial No. 328,265.

*To all whom it may concern:*

Be it known that I, BURRELL T. LANDERS, a citizen of the United States, residing at Cherryvale, in the county of Montgomery and State of Kansas, have invented new and useful Improvements in Handles, of which the following is a specification.

The invention relates to an improvement in handles for agricultural or other implements, comprehending specifically a means whereby the handle is adapted for a secure though removable connection with the implement.

The main object of the present invention is the provision of a socketed handle arranged to receive the shank of the implement, a spring securing means being provided on the handle for engagement with the shank, whereby a single handle is adapted for service with a number of implements.

The invention will be described in the following specification, reference being had particularly to the accompanying drawings, in which—

Figure 1 is a perspective view illustrating the invention. Fig. 2 is a side elevation of the same, partly sectioned to illustrate the connection between the implement and handle. Fig. 3 is a similar view showing a modified form of implement-shank. Fig. 4 is a plan, partly broken off, showing the form of shank indicated in Fig. 3.

Referring to the drawings, my improved handle comprises a section 1, which may be of any material or in any form desired, said section being reduced at the forward end to provide an extension 2, adapted to enter a socket 3, formed in the rear end of a section 4, forming an extension of the handle proper. The section 4 is to be fixedly secured relative to the section 1 and is of a diameter equal to the diameter of section 1, whereby to provide a flush connection at the junction. The section 4 is preferably metallic and is formed in the forward end with a centrally-disposed recess 5, which is angular in cross-section, being preferably square.

The tool or implement 6, which is of course to be of any form, is formed or provided with a shank 7, corresponding in sectional contour and size to the recess 5 in the handle-section 4; said shank being preferably though not necessarily equal in length to the depth of said recess. Adjacent one end the shank 7 is formed with an opening 8, preferably extending entirely through the shank from top to bottom and so disposed longitudinally of the shank as to register with an opening 9 formed in the upper wall of the recess 5 of the handle section 4, when said shank is in operative position within the recess. A latch member 10, comprising a single length of spring material, is secured at one end to the handle-section 4 through the medium of a bolt or pin 11, the opposite end of the latch projecting relatively forward of the opening 9 and being upwardly turned to provide a projection or handle 12 for convenience in operation. The latch member is formed with a depending extension 13, designed to seat in the opening 9, said extension being of sufficient length to project within the recess 5 when the latch member is in operative position.

The implement is connected to the handle by inserting the shank 7 thereof in the recess 5, the latch member being elevated against inherent resiliency of the member to remove the extension 13 from the path of the shank. When the shank is fully inserted, the latch member is released, permitting the extension 13 to enter the opening 8 in the shank, and thereby lock the same in fixed relation to the handle.

In Fig. 3 I have illustrated a modified form of shank, which comprises a single member 14, bent at a point intermediate its length to provide spaced arms 15, which are extended in slightly-divergent relation from the central bend to provide a shank of a length to coöperate with the recess 5, the arms 15 beyond said point being suitably formed to support the tool. Adjacent the bend in the member 14 the proximate faces of the arms 15 are recessed to provide an opening 16 for the reception of the extension 13 of the latch member. By preference the arms 15 will when in contact provide, in effect, a single member having a contour and size corresponding to that of the recess 5.

In use of the modified form of shank it will be noted that the insertion thereof within the recess tends to force the arms 15 together, thereby utilizing the spring tension of the arms as a means for setting the shank within the recess.

The present invention contemplates a means whereby a single handle is adapted to provide for the operative support of a number of implements, it being understood that all of the implements intended for use in any particular occupation may be provided with a shank of either the preferred or modified form, so that said implements may as they are desired for use be connected with the handle. The particular securing means is of simple construction, providing when in locking position a secure holding means for the implement, while at the same time permitting the ready disconnection of the handle and implement by a simple disengagement of the latch member.

Having thus described the invention, what is claimed as new is—

1. The combination with a handle formed in its forward end with a centrally-disposed longitudinally-extending recess, the upper wall of the recess being formed with an opening, and a latch member comprising a single length of material bent at one end to form an eye, bent intermediate its ends to form an extension to register with the opening in the recess-wall, and bent at its forward end to form an eye arranged in a plane at right angles to the first-mentioned eye, and means for securing the eye at the rear end of the latch to the handle, of an implement and a shank therefor arranged to fit the recess in the handle, the shank being formed with an opening to register with the opening in the handle and receive the latch extension.

2. A tool-handle formed in the forward end with a centrally-disposed recess of angular contour, a latch member having an extension projecting through one wall of the recess, and a tool-shank comprising divergent members adapted when in contact to correspond in size and contour to the recess, the proximate faces of the member being recessed to provide an opening to receive the extension of the latch member.

In testimony whereof I affix my signature in presence of two witnesses.

BURRELL T. LANDERS.

Witnesses:
W. L. PLOWMAN,
THOS. J. STRAUB.